United States Patent
Smith et al.

(10) Patent No.: US 6,914,747 B2
(45) Date of Patent: Jul. 5, 2005

(54) DISK DRIVE HAVING ELECTROSTATIC DISCHARGE PATH DEFINED BETWEEN DISK ASSEMBLY AND BASE

(75) Inventors: Gordon James Smith, Rochester, MN (US); Sri M. Sri-Jayantha, Ossining, NY (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 147 days.

(21) Appl. No.: 10/102,345

(22) Filed: Mar. 20, 2002

(65) Prior Publication Data

US 2003/0179495 A1 Sep. 25, 2003

(51) Int. Cl.$^7$ .............................................. G11B 17/02
(52) U.S. Cl. ................................................... 360/99.08
(58) Field of Search ....................... 277/409; 360/99.08, 360/128, 97.02; 338/21; 313/631; 310/71

(56) References Cited

U.S. PATENT DOCUMENTS

| | | | |
|---|---|---|---|
| 5,251,081 A | 10/1993 | Cossette et al. | .......... 360/97.02 |
| 5,696,585 A | 12/1997 | Wahl et al. | ................. 356/507 |
| 5,761,009 A | 6/1998 | Hughbanks et al. | ........ 360/323 |
| 5,969,902 A * | 10/1999 | Okumura et al. | ........ 360/99.08 |
| 6,084,743 A * | 7/2000 | Comstock et al. | ........ 360/97.02 |
| 6,157,516 A * | 12/2000 | Hertrich et al. | ............. 360/128 |
| 6,250,808 B1 | 6/2001 | Ichiyama | .................... 384/100 |
| 6,259,573 B1 | 7/2001 | Tsuwako et al. | .............. 360/46 |
| 6,396,179 B2 * | 5/2002 | Sorenson et al. | ............. 310/71 |
| 6,679,501 B1 * | 1/2004 | Pelstring et al. | ........... 277/409 |
| 2002/0075125 A1 * | 6/2002 | Yang | ........................... 338/21 |
| 2003/0001503 A1 * | 1/2003 | Higashimoto et al. | ...... 313/631 |

FOREIGN PATENT DOCUMENTS

JP 10106130 A * 4/1998

* cited by examiner

*Primary Examiner*—Tianjie Chen
(74) *Attorney, Agent, or Firm*—Robert Martin; Dugan & Dugan, PC

(57) ABSTRACT

In a first aspect, a disk drive includes a base and a disk assembly, including at least one data storage disk, rotatably mounted on the base. The disk drive further includes structure for defining an electrostatic discharge gap between the base and the disk assembly. For example, one or more point electrodes may be provided on the disk assembly, to define the electrostatic discharge gap relative to one or more stationary electrodes mounted on the base. Damaging electrostatic discharges through the read/write head, or at a surface of the data storage disk, may be prevented by the present invention.

18 Claims, 3 Drawing Sheets

DISK DRIVE HAVING ELECTROSTATIC DISCHARGE PATH DEFINED BETWEEN DISK ASSEMBLY AND BASE

FIELD OF THE INVENTION

The present invention is concerned with disk drives, and is more particularly directed to prevention of damaging electrostatic discharges in disk drives.

BACKGROUND OF THE INVENTION

It is known to construct a disk drive by rotationally mounting a disk assembly to a base via conductive metal ball bearings. In such a case, the electrical grounding path provided through the metal ball bearings tends to prevent static electric build up on the disk assembly, thereby preventing harmful discharges through the read/write head.

It is also known to use ceramic ball bearings in place of metal ball bearings to reduce disk run-out. In this case, an electrically conductive grease may be used in the bearing in order to ground the disk assembly, as disclosed in U.S. Pat. No. 6,250,808. However, the quality of the grease may deteriorate over time, leading to breakdown of the ground path and potentially allowing harmful electrostatic discharge to occur.

Another known grounding technique employs one or more cantilever wipers that are pressed against the rotating spindle of the disk assembly, as disclosed in U.S. Pat. No. 5,251,081. However, the contact between parts in relative motion to each other may generate particles, and the ground path may have a limited life due to wear.

According to other proposals, as disclosed in U.S. Pat. Nos. 5,761,009 and 6,259,573, an alternative discharge path is provided through the actuator arm to prevent an electrostatic discharge from passing through the magneto-resistive sensor. Although such arrangements may prevent damage to the read-write head, there still remains the possibility of damage to the data storage disk surface.

Still another arrangement that could be contemplated for preventing harmful electrostatic discharges in a disk drive might entail injecting ionized air into the drive, as is done in testing equipment such as flying height testers (see U.S. Pat. No. 5,696,585). However, cost and space constraints make injection of ionized air impractical for commercial disk drives.

In view of the foregoing, it would be desirable to provide an improved technique for preventing harmful electrostatic discharges in disk drives. Another reason for preventing voltage buildup on data storage disks is that increased voltage may attract particles that may contaminate the disk surface, possibly leading to a head crash. The problem of electrostatic buildup can be particularly acute for disk drives that are operated at high temperatures, since in such a case the ambient air becomes very dry.

SUMMARY OF THE INVENTION

According to a first aspect of the invention, a disk drive is provided. The inventive disk drive includes a base, at least one data storage disk rotatably mounted on the base, at least one first electrode mounted for rotation with the at least one data storage disk, and at least one second electrode fixedly mounted on the base.

In at least one embodiment, each first electrode may include a cone-shaped member pointing outwardly, and each second electrode may include a cone-shaped member pointing inwardly. The at least one first electrode and the at least one second electrode may intermittently define therebetween a discharge gap as the at least one data storage disk is rotated.

According to a second aspect of the invention, a disk drive includes a base, a disk assembly including at least one data storage disk rotatably mounted on the base, and structure for defining an electrostatic discharge gap between the base and the disk assembly.

In one or more embodiments, the electrostatic discharge gap may be intermittently defined between the base and the disk assembly as the disk assembly rotates. The structure for defining the electrostatic discharge gap may include a first electrode mounted for rotation with the disk assembly and a second electrode fixedly mounted on the base. The disk assembly may include a spindle hub having a horizontally extending hub-flange, and the first electrode may be mounted on the hub-flange.

In at least one embodiment, the structure for defining the electrostatic discharge gap may alternatively include a flexible beam having a first end fixedly mounted on the base and a second end on which a plate is mounted adjacent to the disk assembly. A point electrode may be mounted on the plate. The disk assembly may include a spindle hub having a horizontally extending hub-flange, and the electrostatic discharge gap may be defined between the point electrode and the hub-flange.

According to a third aspect of the invention, a disk drive includes a base, a spindle hub rotatably mounted on the base and including an outwardly extending hub-flange, and at least one data storage disk mounted on the spindle hub for rotation therewith. The disk drive according to the third aspect of the invention further includes a flexible beam having a first end fixedly mounted to the base, a plate mounted to a second end of the flexible beam adjacent the hub flange of the spindle hub, and a point electrode mounted on the plate for defining an electrostatic discharge gap relative to the hub-flange.

The disk drive of the third aspect of the invention may operate, for example, so that the plate is attracted to the hub-flange as an electrostatic charge builds up on the at least one data storage disk.

According to a fourth aspect of the invention, a method of operating a disk drive is provided. The method includes providing a disk assembly rotatably mounted on a base, and defining an electrostatic discharge path across an air gap between the disk assembly and the base.

In at least one embodiment, the defining step may include intermittently juxtaposing a first electrode on the disk assembly with a second electrode on the base. Alternatively, the defining step may include attracting toward the disk assembly a plate mounted on the base.

With the inventive apparatus and method, voltages that may build up on the data storage disk or disks may be harmlessly discharged to the disk drive base, without damaging the disk or disks or the read/write head. Since the discharge path is defined without contact between the disk drive assembly and the base, there is no problem with wear or particle generation, nor breakdown of the discharge path.

Other objects, features and advantages of the present invention will become more fully apparent from the following detailed description of exemplary embodiments, the appended claims and the accompanying drawings.

DETAILED DESCRIPTION

A first embodiment of the invention will now be described with reference to FIGS. 1–3.

Figure 1:
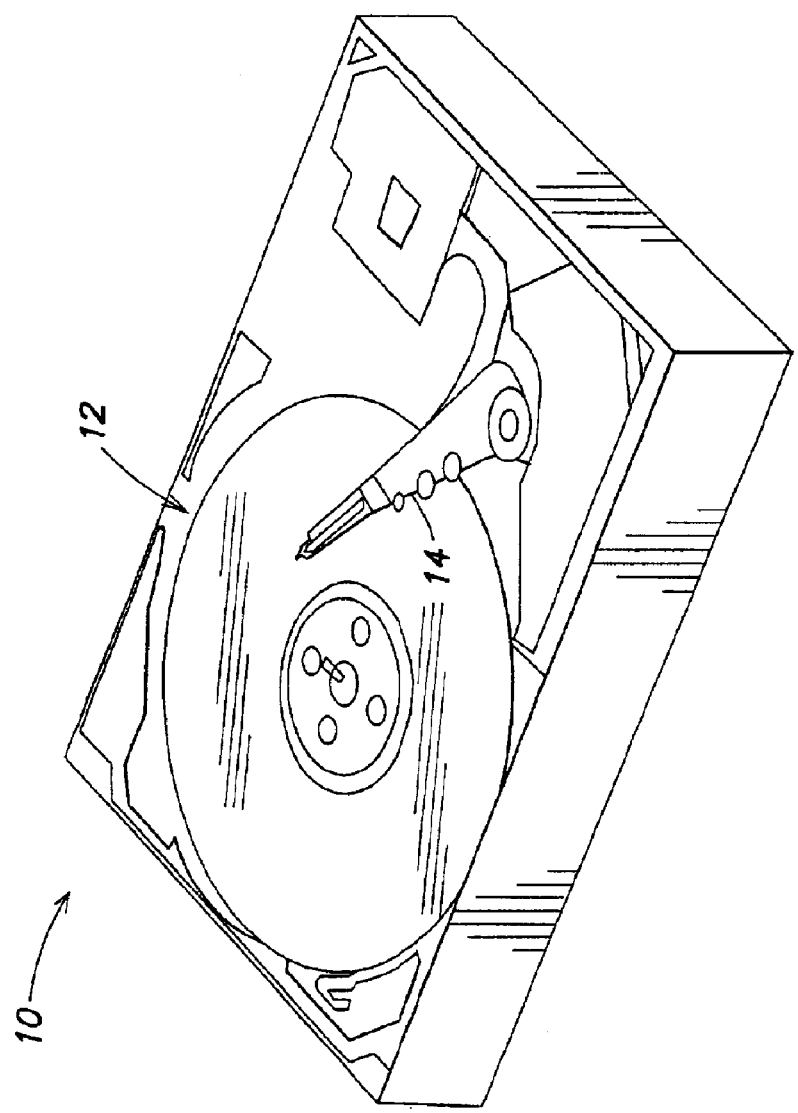
FIG. 1 is a somewhat schematic perspective view of a disk drive in which the present invention may be applied.

FIG. 1 is a simplified and somewhat schematic view of a disk drive 10 in which the present invention may be applied. As is conventional, the disk drive 10 includes a disk assembly 12 and an actuator arm 14.

Figure 2:
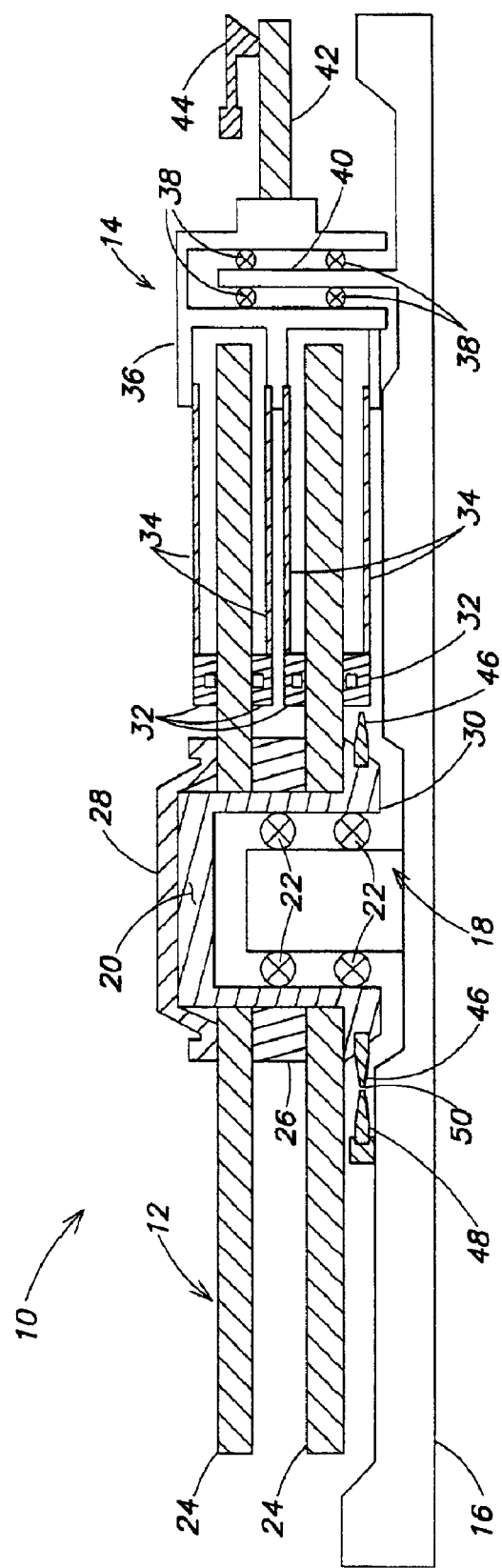
FIG. 2 is a somewhat schematic side view, in section, of a disk drive provided in accordance with a first embodiment of the invention.

FIG. 2 is a simplified and somewhat schematic side view, in section, of the disk drive 10 shown in FIG. 1. As seen from FIG. 2, the disk drive 10 includes a base 16. As is conventional, the base 16 may be formed as a metal casting. Extending upwardly from the base 16 is a spindle bearing assembly 18. The disk assembly 12 includes a spindle hub 20 which is mounted on the spindle bearing assembly 18 via bearings 22. The disk assembly 12 also includes data storage disks 24 which are mounted on the spindle hub 20. Separating the data storage disks 24 is a spacer 26. The data storage disks 24 are held between a clamp 28 and a hub-flange 30 that extends horizontally outwardly from a lower portion of the spindle hub 20.

A motor, which is not shown, imparts rotary motion to the disk assembly 12.

The actuator arm 14 includes sliders 32, of which four are shown in FIG. 2, one for each upper and lower surface of the data storage disks 24. In accordance with conventional practice, a read/write head, which is not separately shown, is mounted in each of the sliders 32. Each slider 32 is mounted on a respective suspension 34 in a manner that allows the sliders 32 to "fly" a very small distance above or below (as the case may be) relative to the respective surface of the data storage disks 24. The suspensions 34 are, in turn, mounted on a comb assembly 36. The comb assembly 36 is pivotally mounted, via bearings 38, to an actuator bearing assembly 40 which extends upwardly from the base 16.

Actuator windings 42 are mounted on the comb assembly 36 extending horizontally in an opposite direction from the suspensions 34. Not shown in the drawing are magnets which are positioned above and below the actuator windings 42. An actuator latch 44 is provided to selectively latch the actuator arm 14 in a home position.

All of the elements of the disk drive 10 described up to this point in connection with FIG. 2 may be constructed in accordance with conventional practices.

In accordance with a first embodiment of the invention, cone-shaped point electrodes 46 are mounted on the hub-flange 30 of the spindle hub 20. Point electrodes 46 extend outwardly from, and point outwardly from, the hub-flange 30. The two point electrodes 46 shown in FIG. 2 are preferably mounted at diametrically opposite positions on the hub-flange 30 so as not to unbalance the disk assembly 12. It will be appreciated that the point electrodes 46 rotate with the rotary disk assembly 12.

Also provided in accordance with the invention is a stationary point electrode 48, which is fixedly mounted on, and electrically grounded to, the base 16. The stationary point electrode 48 is preferably cone-shaped like the rotary point electrodes 46, and points inwardly toward the hub-flange 30 of the spindle hub 20. The rotary point electrodes 46 and the stationary point electrode 48 are sized and positioned so that, as the disk assembly 12 rotates, a discharge gap 50 is intermittently defined between the rotary point electrodes 46 and the stationary point electrode 48 at times when one of the rotary point electrodes 48 is juxtaposed with (at its nearest approach to) the stationary point electrode 48. When one of the rotary point electrodes 46 is so positioned, discharge of any static electric voltage that may have built up on the data storage disks 24 is facilitated. It will be appreciated that the discharge is made through the particular rotary point electrode 46 across the discharge gap 50 to the stationary point electrode 48 and into the base 16.

In one embodiment of the invention, the discharge gap 50 is a distance of 0.002 inch, such that a charge density in excess of 30 kV/cm density is established at the discharge gap 50 when an electrostatic charge of less than 200 volts is built up on the data storage disks 24. (As will be appreciated by those who are skilled in the art, a charge density of 30 kV/cm results in an ionization discharge in dry air.)

In another embodiment of the invention, it is contemplated that the point electrodes 46 and 48 may be positioned to form a discharge gap as small as 0.0001 inch, so that a discharge will occur at the discharge gap 50 upon a build up of less than 10 volts on the data storage disks 24.

In the event that the spacer 26 is not itself of a conductive material, a conductive coating may be provided on the spacer 26 to assure that a reliable electrically conductive path is provided between the data storage disks 24.

Figure 3:
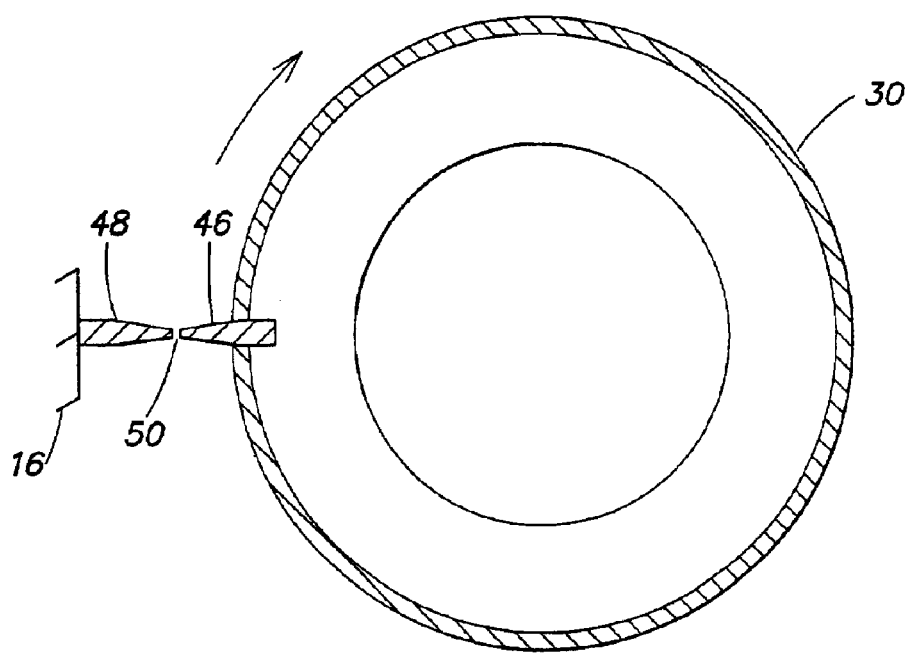
FIG. 3 is a simplified top cross-sectional view of the disk drive of FIG. 2.

FIG. 3 is a somewhat schematic top cross-sectional view of the disk drive 10, illustrating how the discharge gap 50 is formed intermittently as the rotary point electrode 46 is brought into juxtaposition with the stationary point electrode 48. (To simplify the drawing, only one rotary point electrode 46 is shown in FIG. 3.) It will be understood that the base 16, as schematically represented in FIG. 3, corresponds to both electrical and mechanical ground.

In operation, the disk assembly 12 is rotated, and a static electric charge may build up on the disk assembly 12. A discharge gap 50 is intermittently formed between the rotary point electrodes 46 and the stationary point electrode 48. If a static electric charge on the disk assembly 12 builds up to a sufficient level, an electrostatic discharge occurs across the discharge gap 50 to the base 16. In this way, potentially harmful electrostatic discharges through the read/write head, or from the surface of a data storage disk 24, can be prevented.

Figure 4:
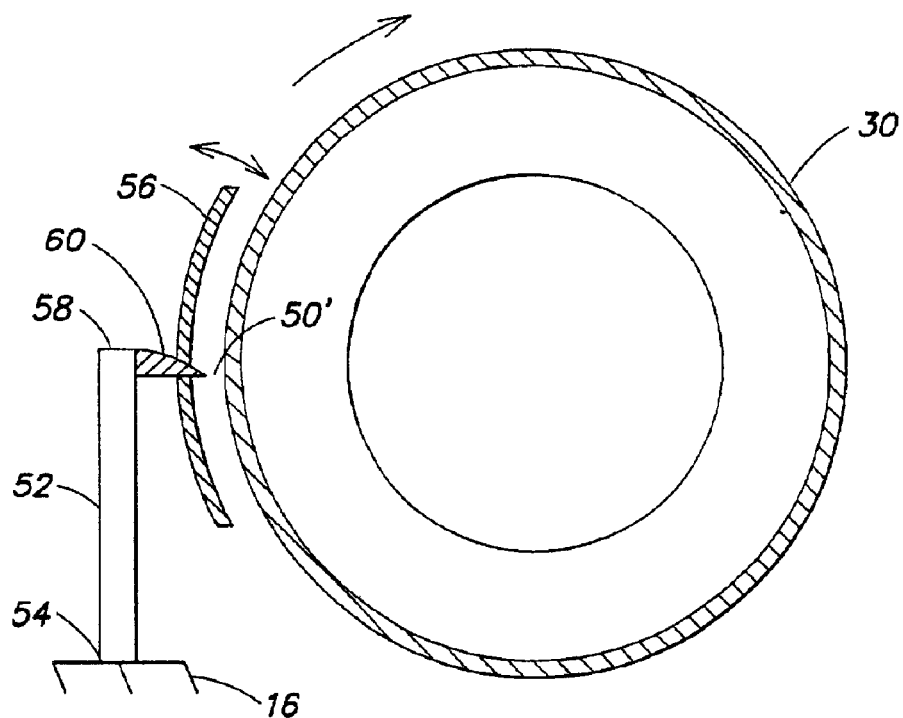
FIG. 4 is a view, similar to FIG. 3, illustrating an alternative embodiment of the invention.

FIG. 4 is a view, similar to FIG. 3, of an alternative embodiment of the invention. In the embodiment of FIG. 4, no point electrode is provided on the hub-flange 30 or elsewhere on the disk assembly 12. The embodiment of FIG. 4 also lacks the fixed point electrode 48 of the embodiment of FIGS. 2 and 3. Instead, the embodiment of FIG. 4 has a flexible cantilever beam 52 having a first end 54 mounted on the base 16. An electrostatic force generator plate 56 is mounted at a second end 58 of the beam 52. A point electrode 60 is mounted at the plate 56 to define a discharge gap 50' between the tip of the point electrode 60 and the hub-flange 30.

In operation, the hub-flange 30 is rotated with the disk assembly 12, and a static electric charge may build up on the disk assembly 12. The plate 56 is attracted to the hub-flange 30 by electrostatic force, and is allowed to move toward the hub flange 30 by flexing of the beam 52. When the tip of the point electrode 60 is brought sufficiently close to the hub-flange 30, an electrostatic discharge occurs from the hub-flange 30 through the point electrode 60 and the beam 52 to the base 16.

As in the case of the embodiment of FIGS. 2 and 3, the discharge from the hub-flange 30 to the base 16 prevents potentially harmful electrostatic discharges through the read/write head and/or from the surface of the data storage disks 24.

The foregoing description discloses only exemplary embodiments of the invention; modifications of the above-disclosed apparatus and methods which fall within the scope of the invention will be readily apparent to those of ordinary skill in the art. For example, instead of the two data storage disks shown in FIG. 2, the invention may be implemented in connection with a disk assembly having only one data storage disk, or having three or more data storage disks. Furthermore, the disks need not be arranged for two-sided data storage.

The embodiment of FIGS. 2 and 3 may be modified by having only one point electrode on the hub-flange, or by having three or more point electrodes on the hub-flange. Also, the number of fixed electrodes may be more than one.

Moreover, the point electrodes need not be cone-shaped, but instead could be, for example, pyramid-shaped.

In the embodiments shown in FIGS. 3 and 4, the electrodes which define the discharge path are positioned externally of the spindle hub 20 and within the drive chamber. It is alternatively contemplated that the electrodes could define the discharge path between the spindle hub 20 and the fixed shaft (spindle bearing assembly 18) on which the spindle hub 20 is mounted. In such an arrangement, if an extreme shock condition were to bring a rotating electrode into contact with a fixed electrode, any resulting debris would not be released into the drive chamber, but rather would be trapped within the spindle hub/ferro fluid system.

From the point of view of minimizing potential contact between fixed and rotating electrodes, it is also contemplated that, if plural fixed electrodes are employed, the same may be spaced such that at any given moment, no more than one rotating electrode is juxtaposed with a fixed electrode. In this way, there could not be simultaneous collisions between fixed and rotating electrodes.

Finally, in the embodiment of FIG. 4 a self-closing configuration is employed to deflect the beam 52 toward the hub-flange 30 of the spindle hub 20. Alternatively, the closing of the discharge gap in this embodiment can be augmented by an actuator system triggered by an electrostatic force detector and/or an electrostatic charge detector.

Accordingly, while the present invention has been disclosed in connection with exemplary embodiment thereof, it should be understood that other embodiments may fall within the spirit and scope of the invention, as defined by the following claims.

The invention claimed is:

1. A disk drive, comprising:
    a base;
    a disk assembly rotatably mounted on the base and including at least one data storage disk; and
    means for defining an electrostatic discharge gap between the base and the disk assembly.

2. The disk drive of claim 1, wherein the electrostatic discharge gap is intermittently defined between the base and the disk assembly as the disk assembly rotates.

3. The disk drive of claim 2, wherein the means for defining includes a first electrode mounted for rotation with the disk assembly and a second electrode fixedly mounted on the base.

4. The disk drive of claim 3, wherein the disk assembly includes a spindle hub having a horizontally extending hub-flange, and the first electrode is mounted on the hub-flange.

5. The disk drive of claim 1, wherein the means for defining includes a flexible beam having a first end fixedly mounted on the base and a second end on which a plate is mounted adjacent to the disk assembly, a point electrode being mounted on the plate.

6. The disk drive of claim 5, wherein the disk assembly includes a spindle hub having a horizontally extending hub-flange, and the electrostatic discharge gap is defined between the point electrode and the hub-flange.

7. A disk drive, comprising:
    a base;
    at least one data storage disk rotatably mounted on the base;
    at least one first electrode mounted for rotation with the at least one data storage disk; and
    at least one second electrode fixedly mounted on the base;
    wherein the at least one first electrode and the at least one second electrode intermittently define therebetween a discharge gap as the at least one data storage disk is rotated.

8. The disk drive of claim 7, wherein each first electrode includes a cone-shaped member pointing outwardly and each second electrode includes a cone-shaped member pointing inwardly.

9. The disk drive of claim 7, wherein the at least one data storage disk is mounted on a rotary spindle hub, the spindle hub including an outwardly extending hub-flange at a lower portion thereof, the at least one first electrode being mounted on the hub-flange.

10. The disk drive of claim 9, wherein each first electrode includes a cone-shaped member pointing outwardly and each second electrode includes a cone-shaped member pointing inwardly.

11. The disk drive of claim 7, wherein the at least one first electrode includes two first electrodes mounted for rotation with the at least one data storage disk.

12. The disk drive of claim 11, wherein the at least one data storage disk is mounted on a rotary spindle hub, the rotary spindle hub including an outwardly extending hub-flange at a lower portion thereof, and the two first electrodes are mounted at diametrically opposed positions on the hub-flange.

13. The disk drive of claim 7, wherein the at least one data storage disk includes two data storage disks, and the disk drive further comprises a spacer in contact with both data storage disks, the spacer having an electrically conductive coating thereon.

14. A disk drive, comprising:
    a base;
    a spindle hub rotatably mounted on the base and including an outwardly extending hub-flange;
    at least one data storage disk mounted on the spindle hub for rotation therewith;
    a flexible beam having a first end fixedly mounted to the base;
    a plate mounted to a second end of the flexible beam and adjacent the hub-flange of the spindle hub; and
    a point electrode mounted on the plate for defining an electrostatic discharge gap relative to the hub-flange.

15. The disk drive of claim 14, wherein the plate is attracted to the hub-flange as an electrostatic charge builds up on the at least one data storage disk.

16. A method of operating a disk drive, comprising:
    providing a disk assembly rotatably mounted on a base, and defining an electrostatic discharge path across an air gap between the disk assembly and the base.

17. The method of claim 16, wherein the defining step includes intermittently juxtaposing a first electrode on the disk assembly with a second electrode on the base.

18. The method of claim 16, wherein the defining step includes attracting toward the disk assembly a plate mounted on the base.

* * * * *